United States Patent
Kryskowski et al.

(10) Patent No.: US 12,019,252 B2
(45) Date of Patent: Jun. 25, 2024

(54) OPTICAL ELEMENT WITH DIFFRACTIVE FOCUSING FEATURES AND DIFFRACTIVE ANTI-REFLECTION FEATURES

(71) Applicants: Analog Devices, Inc., Wilmington, MA (US); UD HOLDINGS, LLC, Dearborn Heights, MI (US)

(72) Inventors: David Kryskowski, Dearborn Heights, MI (US); Krishnan Ramaswamy Parameswaran, Billerica, MA (US)

(73) Assignees: Analog Devices, Inc., Wilmington, MA (US); UD HOLDINGS, LLC, Dearborn Heights, MI (US)

( * ) Notice: Subject to any disclaimer, the term of this patent is extended or adjusted under 35 U.S.C. 154(b) by 561 days.

(21) Appl. No.: 17/103,473

(22) Filed: Nov. 24, 2020

(65) Prior Publication Data

US 2021/0157162 A1    May 27, 2021

Related U.S. Application Data

(60) Provisional application No. 62/940,668, filed on Nov. 26, 2019.

(51) Int. Cl.
*G02B 27/42* (2006.01)
*G02B 1/02* (2006.01)
(Continued)

(52) U.S. Cl.
CPC ........... *G02B 27/4233* (2013.01); *G02B 1/02* (2013.01); *G02B 1/11* (2013.01); *G02B 1/118* (2013.01);
(Continued)

(58) Field of Classification Search
CPC ........ G02B 27/4233; G02B 1/02; G02B 1/11; G02B 1/118; G02B 5/1857; G02B 5/1866;
(Continued)

(56) References Cited

U.S. PATENT DOCUMENTS

| 5,085,496 A | 2/1992 | Yoshida et al. |
| 5,973,827 A | 10/1999 | Chipper |

(Continued)

OTHER PUBLICATIONS

Cannistra, Aaron Thomas, "Design, Fabrication and Testing of Hierarchical Micro-Optical Structures and Systems", Doctorate Dissertation, The U. of North Carolina at Charlotte, (2011), 137 pgs.

(Continued)

*Primary Examiner* — Kimberly N. Kakalec
(74) *Attorney, Agent, or Firm* — Schwegman Lundberg & Woessner, P.A.

(57) ABSTRACT

In an optical element, diffractive focusing features and diffractive anti-reflection features can extend into a first surface of a body, such as by etching. The diffractive focusing features can have a same first depth that is greater than a wavelength, and can be located in a first area to have a duty cycle that varies over the first area. The diffractive anti-reflection features can have a same second depth that is less than the wavelength. In some examples, an effective refractive index of the diffractive focusing features and the diffractive anti-reflection features, together, can be less than or equal to a specified value, such as 120% of a square root of a refractive index of a material of the body. In other examples, the diffractive anti-reflection features can be located in the first area to have a duty cycle that is constant over the first area.

20 Claims, 8 Drawing Sheets

(51) Int. Cl.
*G02B 1/11* (2015.01)
*G02B 1/118* (2015.01)
*G02B 5/18* (2006.01)

(52) U.S. Cl.
CPC ......... *G02B 5/1857* (2013.01); *G02B 5/1866* (2013.01); *G02B 5/1876* (2013.01)

(58) Field of Classification Search
CPC ................ G02B 5/1876; G02B 5/1814; G02B 27/4205; G02B 5/1842
See application file for complete search history.

(56) References Cited

U.S. PATENT DOCUMENTS

| | | | |
|---|---|---|---|
| 5,995,285 | A | 11/1999 | Unno |
| 6,728,036 | B2 | 4/2004 | Kleemann et al. |
| 7,031,078 | B2 | 4/2006 | Ukuda |
| 7,142,363 | B2 | 11/2006 | Sato et al. |
| 7,145,721 | B2 | 12/2006 | Banish et al. |
| 8,797,654 | B2 | 8/2014 | Blum |
| 9,366,877 | B2 | 6/2016 | Tam et al. |
| 2002/0089750 | A1 | 7/2002 | Hoshi |
| 2010/0020400 | A1 | 1/2010 | Amako |
| 2010/0149510 | A1 | 6/2010 | Zaczek et al. |
| 2014/0098422 | A1* | 4/2014 | Fukuda ............ B29D 11/00346 359/601 |
| 2016/0219228 | A1* | 7/2016 | Kintz ..................... G02B 13/14 |
| 2017/0075127 | A1 | 3/2017 | Borrelli et al. |
| 2018/0217395 | A1 | 8/2018 | Lin et al. |

OTHER PUBLICATIONS

Lalanne, Philippe, et al., "Design and fabrication of blazed binary diffractive elements with sampling periods smaller than the structural cutoff", J. Opt. Soc. Am. A, 16(5), (May 1999), 1143-1156.

Lee, Mane-Si Laure, et al., "Sub-wavelength structures for broadband diffractive optics", Proc. SPIE vol. 6029, ICO20: Materials and Nanostructures, (Jan. 23, 2006), 8 pgs.

Shrestha, Sajan, et al., "Broadband Achromatic Metasurface Lenses", CLEO: QELS_Fundamental Science, Optical Society of America, (2017), 2 pgs.

* cited by examiner

OPTICAL ELEMENT WITH DIFFRACTIVE FOCUSING FEATURES AND DIFFRACTIVE ANTI-REFLECTION FEATURES

CROSS-REFERENCE TO RELATED APPLICATION

This application claims the benefit of U.S. Provisional Application No. 62/940,668, filed Nov. 26, 2019, which is hereby incorporated by reference in its entirety.

FIELD OF THE DISCLOSURE

The present disclosure relates generally to a diffractive optical element, and more particularly, to a diffractive optical element that includes an integrated feature that can reduce or eliminate reflection from the element.

BACKGROUND OF THE DISCLOSURE

Diffractive optical elements can perform many of the same functions as refractive optical elements, such as focusing, but in a smaller volume. There is ongoing effort to improve the performance of diffractive optical elements.

SUMMARY

In an example, an optical element can include: a body formed from at least one material that is transparent at a wavelength, the body including a first surface that extends laterally over a first area, the first surface including diffractive focusing features that extend into the body, the diffractive focusing features having a same first depth that is greater than the wavelength, the diffractive focusing features located in the first area to have a duty cycle that varies over the first area, the first surface further including diffractive anti-reflection features that extend into the body, the diffractive anti-reflection features having a same second depth that is less than the wavelength, the diffractive anti-reflection features located in the first area such that an effective refractive index of the diffractive focusing features and the diffractive anti-reflection features, together, is less than or equal to a specified value, such as 120% of a square root of a refractive index of the at least one material at the wavelength.

In another example, a method for forming an optical element can include: providing a body, the body being formed from at least one material that is transparent at a wavelength; etching a plurality of diffractive focusing features into a first area of a first surface of the body, the plurality of diffractive focusing features being etched to a first depth that is greater than the wavelength, the plurality of diffractive focusing features being distributed in the first area to have a duty cycle that varies over the first area; and etching a plurality of diffractive anti-reflection features into the first area of the first surface of the body, the plurality of diffractive anti-reflection features being etched to a second depth that is less than the wavelength, the plurality of diffractive anti-reflection features being distributed in the first area such that an effective refractive index of the diffractive focusing features and the diffractive anti-reflection features, together, is less than or equal to a specified value, such as 120% of a square root of a refractive index of the at least one material at the wavelength.

In another example, an optical element can include: a body formed from at least one of silicon or germanium, the body being transparent at a wavelength, the body including a first surface that extends laterally over a first area, the first surface including means for focusing light at the wavelength, the means for focusing light extending into the body to a same first depth that is greater than the wavelength, the means for focusing light located in the first area to have a duty cycle that varies over the first area, the first surface further including means for reducing reflection of light at the wavelength, the means for reducing reflection of light extending into the body to a same second depth that is less than the wavelength, the means for reducing reflection of light located in the first area such that an effective refractive index of the diffractive focusing features and the diffractive anti-reflection features, together, is less than or equal to a specified value, such as 120% of a square root of a refractive index of the at least one material at the wavelength.

In another example, an optical element can include: a body formed from at least one material that is transparent at a wavelength, the body including a first surface that extends laterally over a first area, the first surface including diffractive focusing features that extend into the body, the diffractive focusing features having a same first depth that is greater than the wavelength, the diffractive focusing features located in the first area to have a duty cycle that varies over the first area, the first surface further including diffractive anti-reflection features that extend into the body, the diffractive anti-reflection features having a same second depth that is less than the wavelength, the diffractive anti-reflection features located in the first area to have a duty cycle that is constant over the first area.

In another example, a method for forming an optical element can include: providing a body, the body being formed from at least one material that is transparent at a wavelength; etching a plurality of diffractive focusing features into a first area of a first surface of the body, the plurality of diffractive focusing features being etched to a first depth that is greater than the wavelength, the plurality of diffractive focusing features being distributed in the first area to have a duty cycle that varies over the first area; and etching a plurality of diffractive anti-reflection features into the first area of the first surface of the body, the plurality of diffractive anti-reflection features being etched to a second depth that is less than the wavelength, the plurality of diffractive anti-reflection features being distributed in the first area to have a duty cycle that is constant over the first area.

In another example, an optical element can include: a body formed from at least one of silicon or germanium, the body being transparent at a wavelength, the body including a first surface that extends laterally over a first area, the first surface including means for focusing light at the wavelength, the means for focusing light extending into the body to a same first depth that is greater than the wavelength, the means for focusing light located in the first area to have a duty cycle that varies over the first area, the first surface further including means for reducing reflection of light at the wavelength, the means for reducing reflection of light extending into the body to a same second depth that is less than the wavelength, the means for reducing reflection of light located in the first area to have a duty cycle that is constant over the first area.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
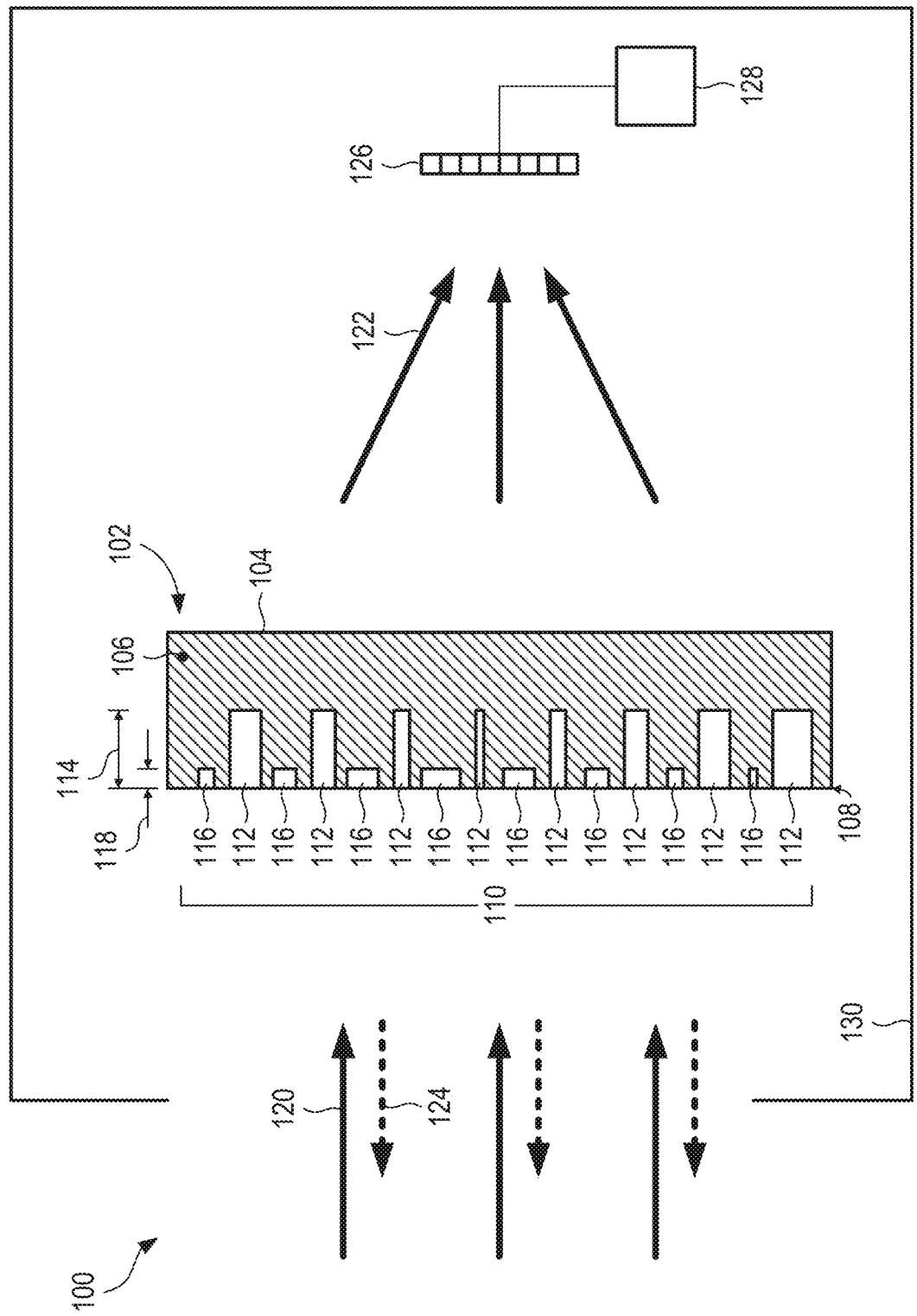
FIG. 1 shows a cross-sectional side view of an example of an optical system that includes an optical element, in accordance with some examples.

In an optical element, diffractive focusing features and diffractive anti-reflection features can extend into a first surface of a body, such as by etching. The diffractive focusing features can have a same first depth that is greater than the wavelength, and can be located in a first area to have a duty cycle that varies over the first area. The diffractive anti-reflection features can have a same second depth that is less than the wavelength. In some examples, an effective refractive index of the diffractive focusing features and the diffractive anti-reflection features, together, can be less than or equal to a specified value, such as 120% of a square root of a refractive index of a material of the body. In other examples, the diffractive anti-reflection features can be located in the first area to have a duty cycle that is constant over the first area.

Compared with traditional optical elements, the optical element discussed herein can include several advantages, which are detailed below.

First, the optical element discussed herein can be formed at a wafer level, using standard semiconductor fabrication processes. These semiconductor processes can be extremely cost-effective in producing relatively large quantities of devices, especially when compared with more traditional fabrication techniques, such as molding, or grinding and polishing.

Second, the optical element discussed herein can be planar in shape, and can occupy less volume than a comparable refractive lens, which can be relatively thick at its center (for a lens having positive optical power) or relatively thick at its edges (for a lens having negative optical power).

Third, compared with conventional optical elements that use thin-film coatings to reduce reflections, the optical element discussed herein can reduce reflections using only the material of the substrate, such as silicon or germanium. For the optical element discussed herein, the anti-reflection properties can be achieved at the wafer level, without using an additional coating step and without using any materials other than that of the substrate.

Fourth, because the optical element discussed herein uses variations in duty cycle of the features (e.g., variations in the lateral size of the features, from feature-to-feature) to determine the optical effects of the lens, rather than variations in feature depth, the optical element discussed herein can be formed with as few as two depths. Compared with diffractive elements that use a relatively large number of depths to approximate a refractive surface, such as for a Fresnel lens, the optical element discussed herein can beneficially reduce the number of etch steps required to produce the optical element.

Fifth, the anti-reflection properties of the optical element discussed herein are unexpectedly found to be relatively insensitive to wavelength. Compared with optical elements that reduce reflections with thin-film coatings, which are typically effective over a relatively narrow range of wavelengths, the optical element discussed herein are found to reduce reflections over an unexpectedly large range of wavelengths. Similarly, the large range of wavelengths over which the optical element discussed herein can operate is significantly larger than a range of wavelengths over which a Fresnel lens, or a comparable digital diffractive approximation of a Fresnel lens, can operate. For example, a simulation of a silicon diffractive optic that includes focusing diffractive focusing but lacks diffractive anti-reflection features shows a transmission that oscillates with wavelength between about 70% and about 85%, for wavelengths between 7 microns and 15 microns. A simulation of a similar silicon diffractive optics that further includes the diffractive anti-reflection features increases the transmission values to oscillate between about 87% and about 100% over the same wavelength range between 7 microns and 15 microns, with the transmission values exceeding 95% for all wavelengths between 8 microns and 12 microns.

Other Benefits are Also Possible.

FIG. 1 shows a cross-sectional side view of an example of an optical system 100 that includes an optical element 102, in accordance with some examples. In some examples, the optical system 100 can be configured as a stand-alone camera, a camera that is integrated into a user device such as a smart phone or a laptop computer, or another configuration. For examples in which the optical system 100 is configured as a camera, the optical element 102 can function as a lens. The optical element 102 can receive incident light 120 and can focus the incident light to form focused light 122. Because the optical element 102 includes the diffractive anti-reflection features 116 discussed herein, the optical element 102 produces a reduced (or eliminated) amount of reflected light 124 from reflections of the incident light 120 from the first surface 108. The optical system 100 can further include a detector 126 positioned to receive the focused light 122 and produce an electrical signal that represents an image formed on the detector 126. The optical system 100 can further include processing circuitry 128 to receive and process the electrical signal from the detector 126. The optical element 102, the detector 126, and the processing circuitry 128 can be positioned on or within a housing 130. The housing 130 can be formed as an exterior surface of a smart phone, an exterior surface of a stand-alone camera, or another suitable configuration.

The optical element 102 can include a body 104. In some examples the body 104 can be formed as all or a part of a wafer, such as a semiconductor wafer. In other example, the body 104 can be formed from a block or irregularly-shaped piece of material, which can be cut and/or polished to a desired size and shape.

The body 104 can be formed from at least one material 106 that is transparent at a wavelength. In some examples, the wavelength can be in the range of infrared wavelengths, such as between about 7 microns and about 14 microns. Suitable materials that are generally transparent in this wavelength range can include silicon, germanium, ZnSe, ZnS, As40Se60, various chalcogenides, and others. In some examples, these materials are available in wafer form, and can be processed by typical semiconductor processing, including etching to one or more prescribed depths.

The body 104 can include a first surface 108 that extends laterally over a first area 110. In some examples, the first surface 108 is planar. In other examples, the first surface 108 can be curved or irregularly shaped. In some examples, the first area 110 can correspond to a clear aperture of the first surface 108, which is a region of the first surface 108 that can receive light and redirect the light in a specified manner. In some examples, the first area 110 can be circular or oval-shaped, with a boundary that lacks corners. In other examples, the first area 110 can be square, rectangular, polygonal, or another suitable shape that includes at least one corner. Other suitable shapes can also be used.

The first surface 108 can include diffractive focusing features 112 that extend into the body 104. In some examples, the diffractive focusing features 112 are etched into the first surface 108 of the body 104. In other examples, the diffractive focusing features 112 can be formed by growing or depositing material onto the first surface 108 of the body 104. Other suitable manufacturing techniques can also be used.

The diffractive focusing features 112 can have lateral sizes (e.g., sizes measured in directions that are parallel to the first surface 108) that are smaller than the wavelength. For infrared wavelengths, such as the range of wavelengths between about 7 microns and about 14 microns, the lateral sizes can be on the order of about 0.5 microns. These lateral sizes can easily be achieved using relatively old (and, therefore, relatively inexpensive) photolithographic techniques.

Because the individual diffractive focusing features 112 are smaller than the wavelength of light, the light interacts with the diffractive focusing features 112 in an averaged manner. More specifically, the light effectively averages, or "smears" the diffractive focusing features 112 over a "sliding window" that is approximately the size of the wavelength. This averaging can allow for approximating the first surface 108 of the body 104 as having an effective refractive index. In general, the effective refractive index can be a function of how much material 106 is in a given area or a given volume, a function of the bulk refractive index of the material 106, and a function of any other material surrounding the material 106 (in this case, air). Details regarding the effective refractive index are provided below.

Whereas some diffractive lenses use features having a relatively large number of discrete depths to approximate a diffractive surface, such as a Fresnel lens, the optical element 102 instead uses a reduced number of depths, and variation in the lateral size of the features across the first area 110 of the first surface 108 of the body 104. Such variation in lateral size can be achieved easily as part of forming a photolithography mask. Using variation in feature size can use a reduced number of etching steps, compared with comparable optical elements that use variation in depth, rather than variation in feature size. As a result, the diffractive focusing features 112 can have a same first depth 114 that is greater than the wavelength. In some examples, the first depth can be between about twice the wavelength and about five times the wavelength. Other suitable depths can also be used. Because the features have the same depth, they can be formed using a single etching step, which is beneficial.

The diffractive focusing features 112 can be located in the first area 110 to have a duty cycle that varies over the first area 110. Details regarding specific definition of the duty cycle are provided below.

The first surface 108 can further include diffractive anti-reflection features 116 that extend into the body 104. Unlike the diffractive focusing features 112, which are intended to have a focusing effect on light that passes through the diffractive focusing features 112, the diffractive anti-reflection features 116 are intended to reduce an amount of light that is reflected from the first surface 108. It is worth noting that the diffractive focusing features 112 and the anti-reflection features 116 can be positioned on the same surface, in this case the first surface 108. Positioning both of these sets of diffractive features on the same surface can allow the surface to focus light with an increased efficiency (e.g., with less reflection), without the need for adding a dedicated anti-reflection coating on the surface The diffractive anti-reflection features 116 can have a same second depth 118 that is less than the wavelength. In some examples, the diffractive anti-reflection features 116 can be etched into the first surface 108. Because the features have the same depth, they can be formed using a single etching step, which is beneficial.

The specific depth of the anti-reflection features 116 can vary. It is found that the features 116 have a peak performance (e.g., produce a minimum amount of reflected light) when the second depth 118 equals or substantially equals the wavelength, divided by four, divided by a square root of the refractive index of the at least one material 106 at the wavelength. Performance degrades slightly (e.g., the amount of reflected light increases slightly from its minimum value) as the second depth 118 varies from the value stated above. In some examples, the second depth 118 can vary within 1%, 5%, 10%, 20%, or another suitable fraction of the optimal value stated above.

There are several options available regarding how the diffractive anti-reflection features 116 are positioned within the first area 110. Three such options are discussed below.

In a first configuration, the diffractive anti-reflection features 116 can be located in the first area 110 such that an effective refractive index of the diffractive focusing features 112 and the diffractive anti-reflection features 116, together, is less than or equal to 120% (or another suitable percentage, such as 150%, 110%, 105%, 102%, 101%, or 100%) of a square root of a refractive index of the at least one material 106 at the wavelength.

In a specific example of the first configuration, a duty cycle of the diffractive focusing features 112 within a first portion of the first area 110 is defined as a combined surface area of the diffractive focusing features 112 that are at least partially within the first portion, divided by a surface area of the first portion. In this example, a first quantity is defined as a combined surface area of the diffractive focusing features 112 that are at least partially within a second portion of the first area and the diffractive anti-reflection features that are at least partially within the second portion, divided by a surface area of the second portion. In this example, a second quantity is defined as unity minus the first quantity. In this example, a third quantity is defined as the second quantity multiplied by the refractive index of the at least one material at the wavelength. In this example, the effective refractive index for the second portion is defined as a sum of the first quantity and the third quantity. The surface area of the first portion can be larger than a square of the wavelength.

It should be noted that the above technique for calculating effective refractive index is but one example of how to calculate effective refractive index. Other techniques are possible, which are known to one of ordinary skill in the art. For example, for a quantity f being defined as a volume fraction of the diffractive focusing features 112 and the diffractive anti-reflection features 116, and a quantity ns being defined as a refractive index of the substrate, a polarization-independent refractive index n can be determined as:

$$n = \left| \frac{[1 - f + fn_s^2][f + (1 - f)n_s^2] + n_s^2}{2(f + (1 - f)n_s^2)} \right|^{1/2}$$

In a second configuration, the diffractive anti-reflection features 116 can be located in the first area 110 to have a duty cycle that is constant over the first area 110.

In a specific example of the second configuration, the duty cycle of the diffractive focusing features 112 within a first portion of the first area is defined as a combined surface area of the diffractive focusing features 112 that are at least partially within the first portion, divided by a surface area of the first portion.

In this specific example of the second configuration, the duty cycle of the diffractive anti-reflection features 116 within a second portion of the first area is defined as a combined surface area of the diffractive anti-reflection features 116 that are at least partially within the second portion, divided by a surface area of the second portion. The surface area of the first portion and the surface area of the second portion can each be larger than a square of the wavelength.

In a third configuration, the duty cycle of the diffractive anti-reflection features 116 can take on any suitable value between the duty cycle in the first configuration (determined using the surface area of the diffractive anti-reflection features 116 and the diffractive focusing features 112) and the duty cycle in the second configuration (determined using the surface area of just the diffractive anti-reflection features 116), inclusive.

For all three of the configurations discussed above, the diffractive focusing features 112 and the diffractive anti-reflection features 116 can be located on first surface 108 with any suitable positioning pattern. For example, the pattern can be regular, so that the surface area of the diffractive anti-reflection features 116 and the diffractive focusing features 112 can have centers and orientations that are regularly positioned across the first surface 108. As another example, the pattern can be irregular, so that at least some of the surface area of the diffractive anti-reflection features 116 and/or the diffractive focusing features 112 can have locations and/or orientations that can vary across the first surface 108. In general, because the features 112, 116 are smaller than the wavelength, their precise positions are less significant than their surface areas when averaged over a "sliding window" that is larger than the wavelength. Because these features 112, 116 can be located using photolithographic masks, there is little difference (in effort or difficulty) between locating the features regularly or irregularly. For ease of explanation, the following discussion assumes that the features 112, 116 are positioned regularly; it will be understood that these features 112, 116 may also be positioned irregularly.

Figure 2:
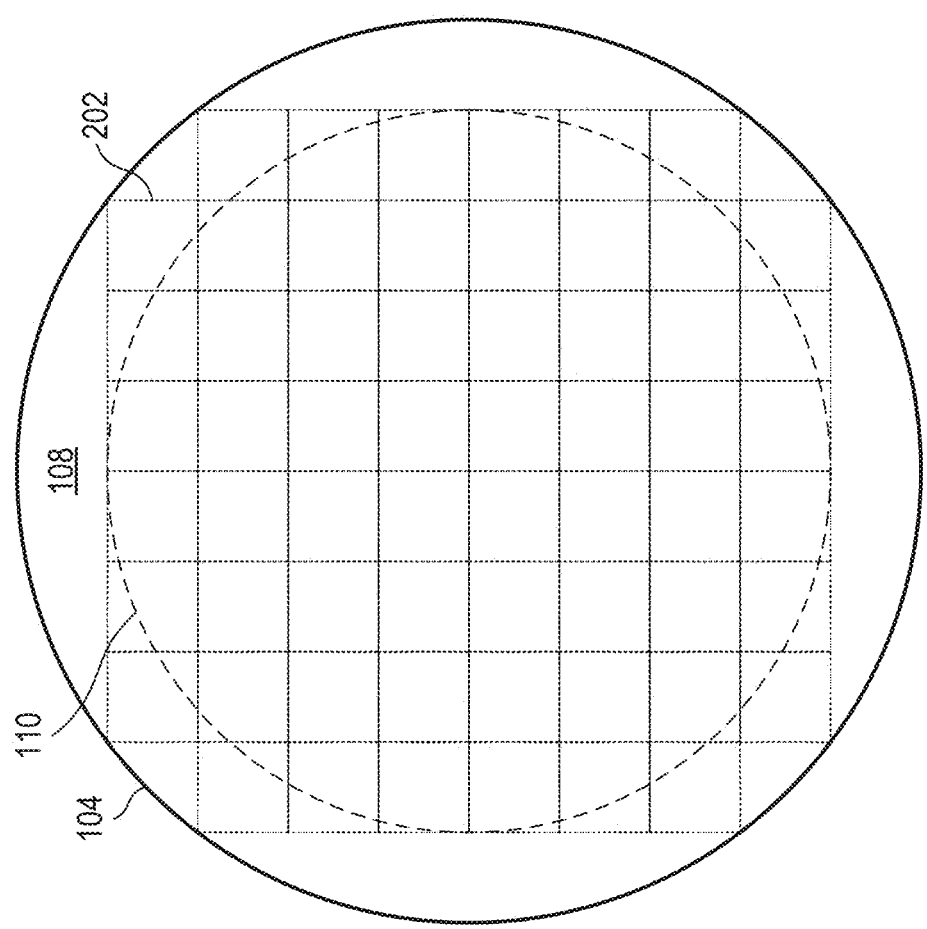
FIG. 2 shows a front view of the first surface of the body of the optical system of FIG. 1, in accordance with some examples.

FIG. 2 shows a front view of the first surface 108 of the body 104 of the optical system 100 of FIG. 1, in accordance with some examples. The configuration of FIG. 2 shows but one example of a patterning scheme for the features 112, 116; other patterning schemes can also be used.

The first area 110 of the first surface 108 can be divided up into areas representing unit cells 202. In some examples, the unit cells 202 are arranged in a pattern that repeats over the first area 110 of the first surface 108. In the example of FIG. 2, the unit cells 202 are square; other suitable shapes can be used, including rectangular, triangular, hexagonal, or others.

Figure 3:
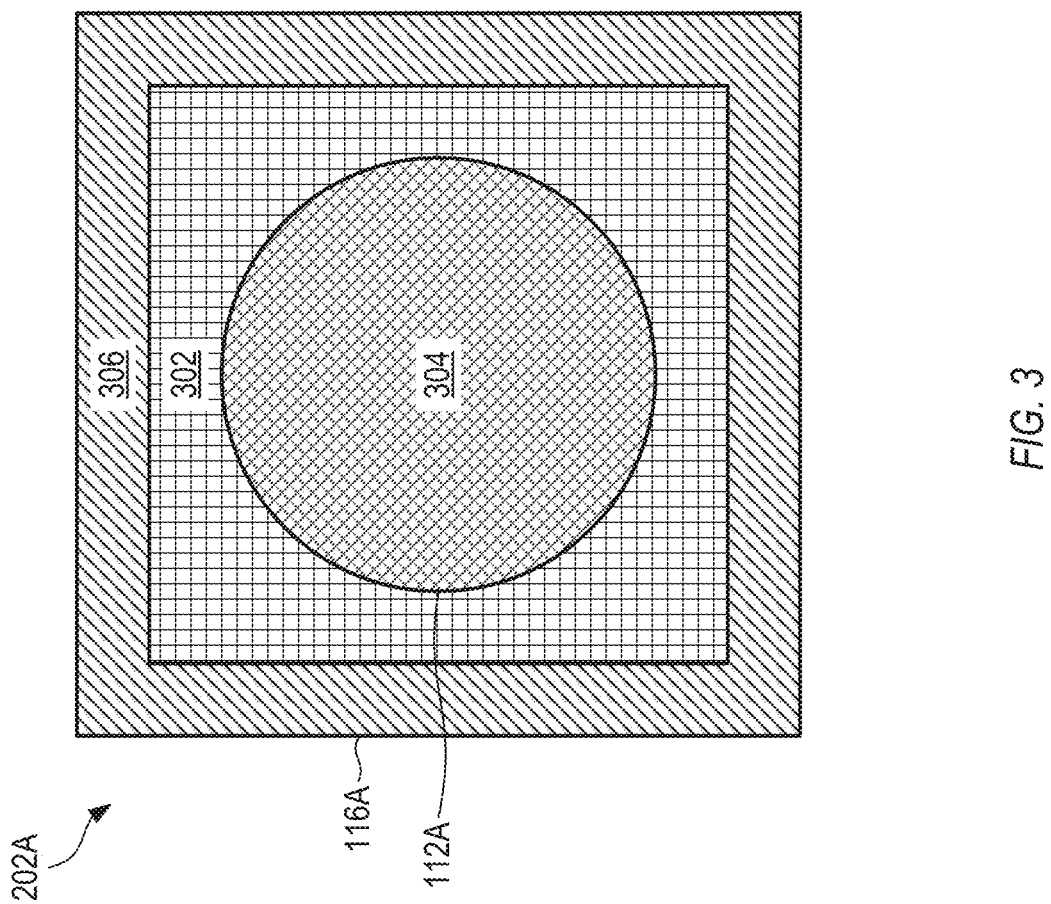
FIG. 3 shows an example of an arrangement of features within a unit cell, in accordance with some examples.

FIG. 3 shows an example of an arrangement of features within a unit cell, in accordance with some examples. The example of FIG. 3 is but one example; it will be understood that the arrangement can vary from unit cell to unit cell in a single device.

In the example of FIG. 3, the unit cell 202A is square, with a size of 2 microns on a side, such that the unit cell 202A has a total surface area of 4 square microns. In the example of FIG. 3, the unit cell 202A is formed on a silicon substrate, with features etched into various areas of the unit cell 202A. Area 302 represents an unetched area of the silicon substrate. Other suitable sizes can also be used, including 2.2 microns, 2.5 microns, and others.

In the example of FIG. 3, a diffractive focusing feature 112A occupies a circular area 304 at the center of the unit cell 202A. In the example of FIG. 3, the circular area 304 has a diameter of 1.2 microns. As a result, the circular area 304 has a surface area of 1.13 square microns, so that the diffractive focusing feature 112A has a duty cycle of about 28% (e.g., equal to the surface area of the circular area 304 divided by the surface area of the unit cell 202A). In the example of FIG. 3, the diffractive focusing feature 112A can be etched to a depth of 20 microns.

In the example of FIG. 3, a diffractive anti-reflection feature 116A occupies a square border area 306 around a perimeter of the unit cell 202A. In the example of FIG. 3, border area 306 has a width of 0.2 microns. (As a practical matter, the unit cells can adjoin one another, so that in a real device, the diffractive anti-reflection features can have a real width of 0.4 microns, which is split between two adjoining unit cells.) As a result, the border area 306 has a surface area of 1.44 square microns, so that the diffractive anti-reflection feature 116A has a duty cycle of 36% (e.g., equal to the surface area of the border area 306 divided by the surface area of the unit cell 202A). In the example of FIG. 3, the duty cycle of the diffractive focusing feature 112A and the diffractive anti-reflection feature 116A, combined, is about 64% (e.g., 28% plus 36%). In the example of FIG. 3, the diffractive anti-reflection feature 116A can be etched to a depth of 1.5 microns.

Figure 4:
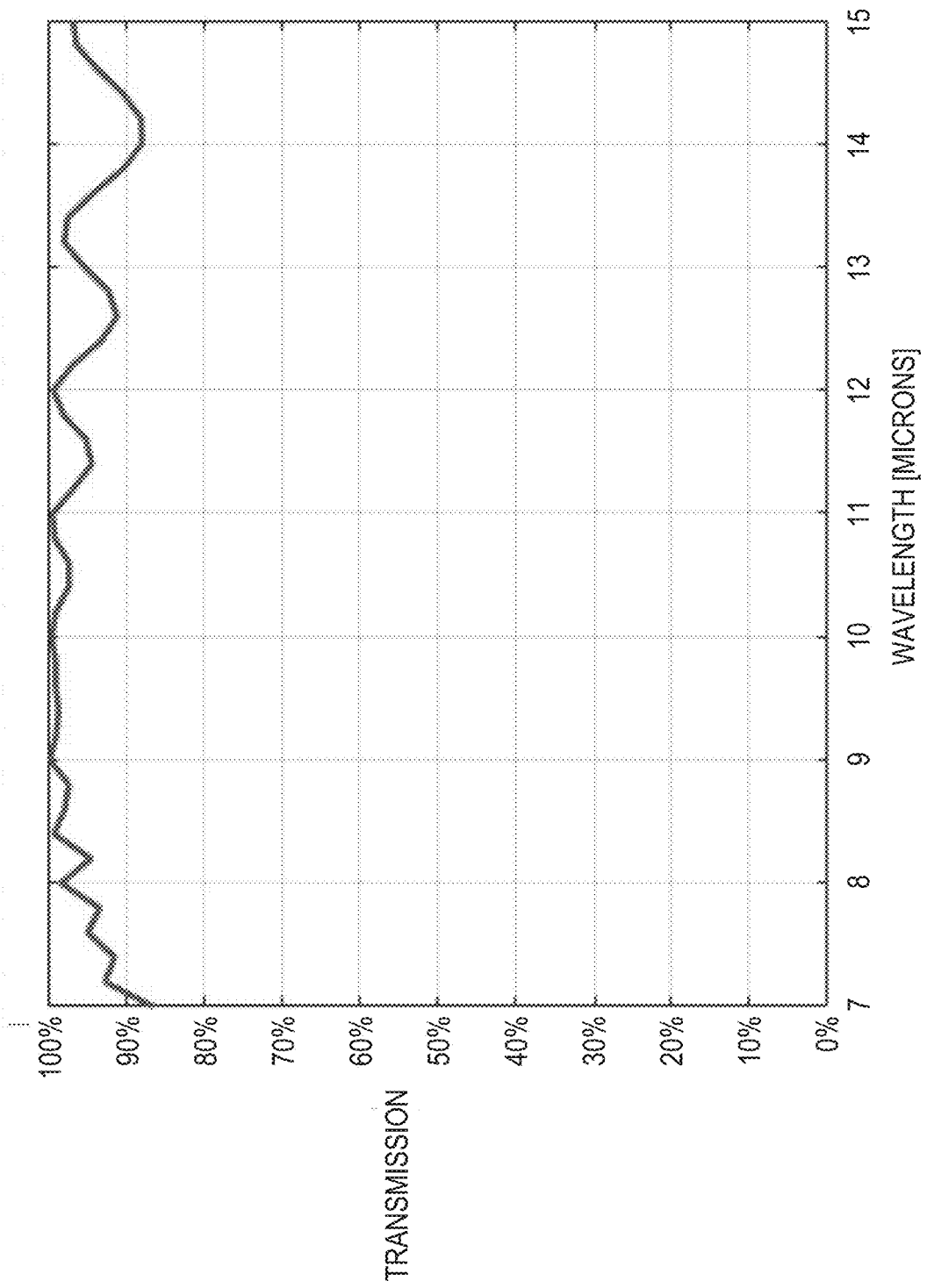
FIG. 4 shows a plot of a simulated transmission of a surface having the diffractive features shown in FIG. 3, for wavelengths between 7 microns and 15 microns, in accordance with some examples.

FIG. 4 shows a plot of a simulated transmission of a surface having the diffractive features shown in FIG. 3, for wavelengths between 7 microns and 15 microns, in accordance with some examples. The simulated transmission is defined as a fraction of incident light that enters the silicon substrate material. For silicon, which is essentially fully transparent (e.g., non-absorbing) for wavelengths between 7 microns and 15 microns, a fraction of light reflected from the surface equals 100% minus the transmission shown in FIG. 4.

The plot of FIG. 4 has a value of about 87% at a wavelength of 7 microns, rises (with calculation noise) to a value of about 95% at 8 microns, oscillates between 95% and about 100% between 8 microns and 12 microns, drops to about 91% at about 12.6 microns, rises to about 98% at about 13.3 microns, drops to 87% at about 14.1 microns, then rises to about 96% at 15 microns.

In particular, the plot of FIG. 4 shows that the diffractive anti-reflection feature 116A is effective. Unexpectedly, the diffractive anti-reflection feature 116A is found to be effective over the relatively large wavelength range of 7 microns to 15 microns. Compared to an anti-reflection thin-film coating, such as a well-known V-coat, the wavelength range of effectiveness is significantly larger with the diffractive anti-reflection feature 116A.

Figure 5:
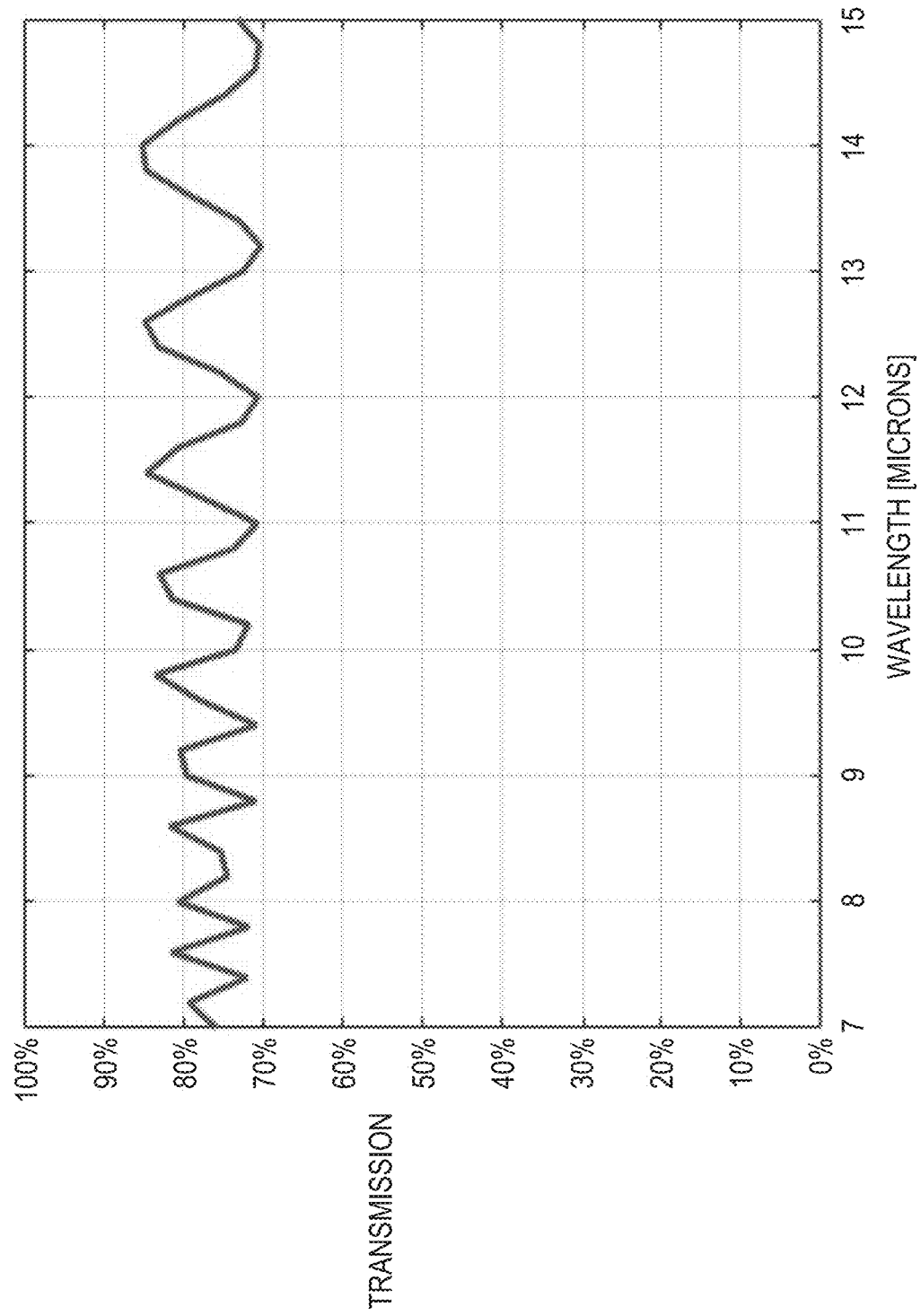
FIG. 5 shows a plot of a simulated transmission of a surface having the diffractive focusing features shown in FIG. 3 but lacking the diffractive anti-reflection features shown in FIG. 3, for wavelengths between 7 microns and 15 microns, in accordance with some examples.

To demonstrate how effective the diffractive anti-reflection features are, FIG. 5 shows a plot of a simulated transmission of a surface having the diffractive focusing features shown in FIG. 3 but lacking the diffractive anti-reflection features shown in FIG. 3, for wavelengths between 7 microns and 15 microns, in accordance with some examples.

The plot of FIG. 5 oscillates between about 70% and about 85%. As such, the calculated values in FIG. 5 are significantly less than the corresponding calculated values shown in FIG. 4.

Figure 6:
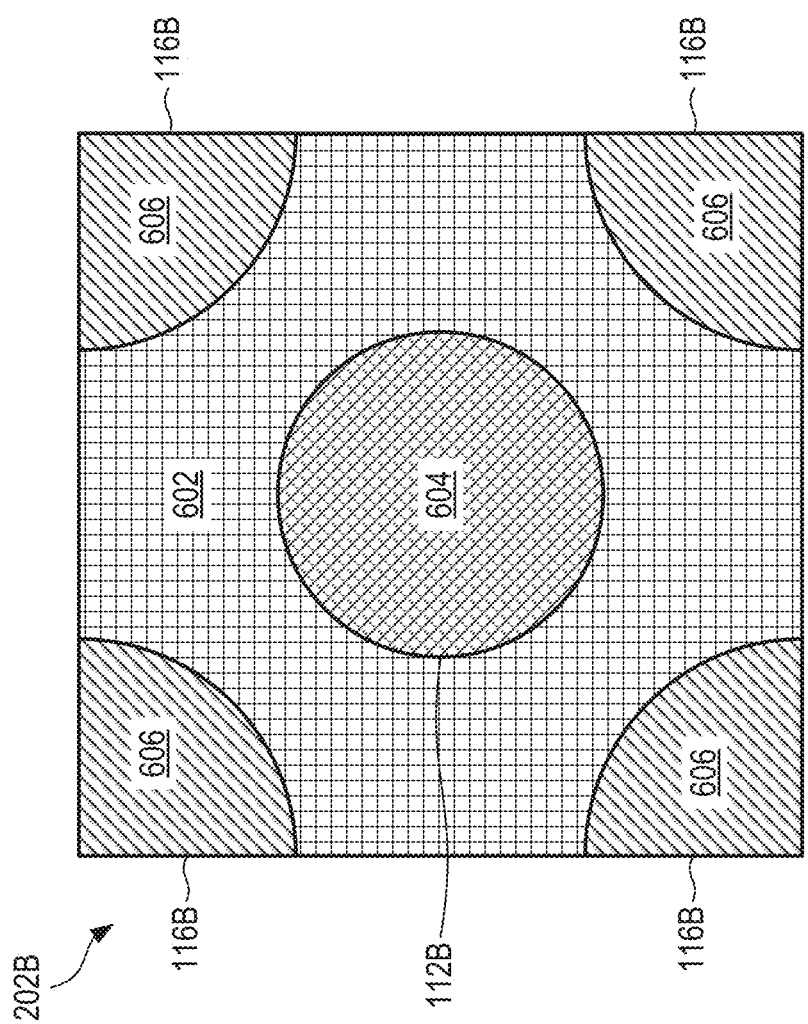
FIG. 6 shows another example of an arrangement of features within a unit cell, in accordance with some examples.

FIG. 6 shows another example of an arrangement of features within a unit cell, in accordance with some examples. The example of FIG. 6 is but one example; it will be understood that the arrangement can vary from unit cell to unit cell in a single device.

In the example of FIG. 6, the unit cell 202B is square, with a size of 2 microns on a side, such that the unit cell 202B has a total surface area of 4 square microns. In the example of FIG. 6, the unit cell 202B is also formed on a silicon substrate, with features etched into various areas of the unit cell. Area 602 represents an unetched area of the silicon substrate.

In the example of FIG. 6, a diffractive focusing feature 112B occupies a circular area 604 at the center of the unit cell 202B. In the example of FIG. 6, the circular area 604 has a diameter of 0.9 microns. As a result, the circular area 604 has a surface area of 0.64 square microns, so that the diffractive focusing feature 112B has a duty cycle of about 16% (e.g., equal to the surface area of the circular area 604 divided by the surface area of the unit cell 202B). In the example of FIG. 6, the diffractive focusing feature 112B can be etched to a depth of 20 microns.

In the example of FIG. 6, a diffractive anti-reflection feature 116B can occupy four areas 606 in the corners of the unit cell 202B. Specifically, the diffractive anti-reflection feature can be circular and centered on corners of the unit cell, such that each corner of the unit cell includes one-fourth of a circle. In the example of FIG. 6, each of the four areas 606 can have a radius of 0.6 microns, such that the four areas 606, combined, have a surface area of about 1.13 square microns, so that the diffractive focusing feature 116B has a duty cycle of about 28% (e.g., equal to the surface area of the four areas 606, combined, divided by the surface area of the unit cell 202B). In the example of FIG. 6, the duty cycle of the diffractive focusing feature 112B and the diffractive anti-reflection feature 116B, combined, is about 44% (e.g., 16% plus 28%). In the example of FIG. 6, the diffractive anti-reflection feature 116B can be etched to a depth of 1.5 microns.

Figure 7:
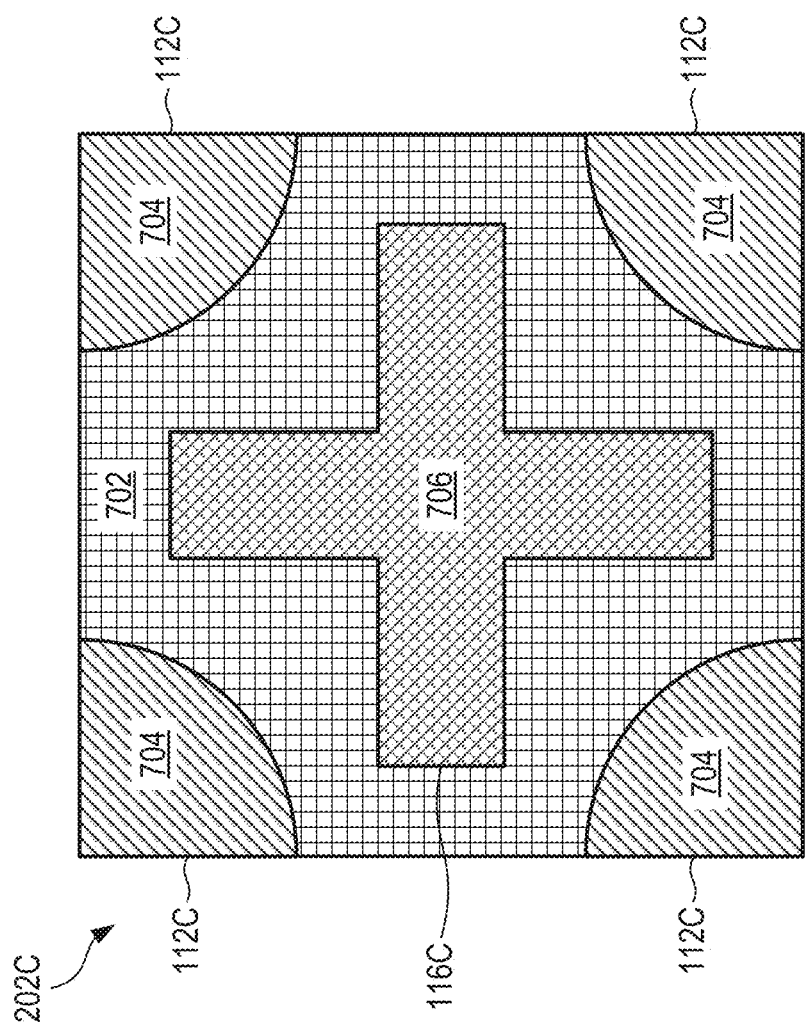
FIG. 7 shows still another example of an arrangement of features within a unit cell, in accordance with some examples.

FIG. 7 shows still another example of an arrangement of features within a unit cell, in accordance with some examples. The example of FIG. 7 is but one example; it will be understood that the arrangement can vary from unit cell to unit cell in a single device.

In the example of FIG. 7, the unit cell 202C is square, with a size of 2 microns on a side, such that the unit cell 202C has a total surface area of 4 square microns. In the example of FIG. 7, the unit cell 202C is also formed on a silicon substrate, with features etched into various areas of the unit cell. Area 702 represents an unetched area of the silicon substrate.

In the example of FIG. 7, a diffractive focusing feature 112C can occupy four areas 704 in the corners of the unit cell 202C. Specifically, the diffractive focusing feature can be circular and centered on corners of the unit cell, such that each corner of the unit cell includes one-fourth of a circle. As a result, the diffractive focusing feature 112C has a duty cycle of about 28% (e.g., equal to the surface area of the four areas 704, combined, divided by the surface area of the unit cell 202C). In the example of FIG. 7, the diffractive focusing feature 112C can be etched to a depth of 20 microns.

In the example of FIG. 7, a diffractive anti-reflection feature 116C occupies a cross-shaped area 706 at the center of the unit cell 202C. In the example of FIG. 7, each leg of the cross-shaped area 706 has dimensions of 0.35 microns by 1.5 microns. As a result, the cross-shaped area 706 has a surface area of 0.93 square microns, so that the diffractive anti-reflection feature 116C has a duty cycle of about 23% (e.g., equal to the surface area of the cross-shaped area 706 divided by the surface area of the unit cell 202C). In the example of FIG. 7, the duty cycle of the diffractive focusing feature 112C and the diffractive anti-reflection feature 116C, combined, is about 51% (e.g., 28% plus 23%). In the example of FIG. 7, the diffractive anti-reflection feature 116C can be etched to a depth of 1.5 microns.

While FIGS. 3, 6, and 7 show examples of unit cells that include a diffractive focusing feature and a diffractive anti-reflection feature, it will be understood that other suitable unit cells can also be used. In some examples, the unit cell can be dimensioned such that its longest dimension is less than a wavelength, and/or its surface area is less than a square of the wavelength. In some examples, the precise layout of the diffractive features in the unit cell is less important than the surface area occupied by the diffractive features. As such, any or all of the diffractive features can be repositioned, reoriented, broken up into various non-contiguous portions, and so forth.

Figure 8:
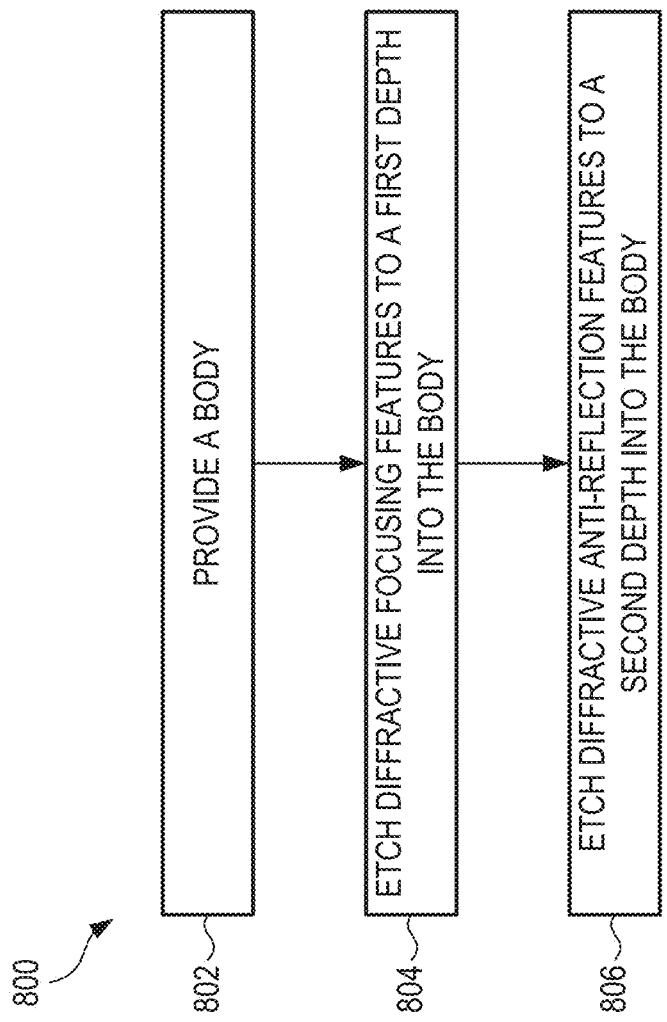
FIG. 8 shows a flowchart of an example of a method for forming an optical element, in accordance with some examples.

FIG. 8 shows a flowchart of an example of a method 800 for forming an optical element, in accordance with some examples. The method 800 can be executed to form the optical element 102 of FIG. 1, or form any suitable optical element 102. The method 800 is but one example of a method for forming an optical element; other suitable elements can also be used.

At operation 802, the method 800 can include providing a body. The body can be formed from at least one material that is transparent at a wavelength. In some examples, At operation 804, the method 800 can include etching a plurality of diffractive focusing features into a first area of a first surface of the body. The plurality of diffractive focusing features can be etched to a first depth that is greater than the wavelength. The plurality of diffractive focusing features can be distributed in the first area to have a duty cycle that varies over the first area.

At operation 806, the method 800 can include etching a plurality of diffractive anti-reflection features into the first area of the first surface of the body. The plurality of diffractive anti-reflection features can be etched to a second depth that is less than the wavelength. The diffractive focusing features of operation 804 can be etched before or after the diffractive anti-reflection features of operation 806, or both before and after the diffractive anti-reflection features of operation 806, if desired.

In some examples, the plurality of diffractive anti-reflection features can be distributed in the first area such that an effective refractive index of the diffractive focusing features and the diffractive anti-reflection features, together, can be less than or equal to 120% of a square root of a refractive index of a material of the body. In other examples, the diffractive anti-reflection features can be located in the first area to have a duty cycle that is constant over the first area.

In these examples, the duty cycle of the diffractive focusing features within a first portion of the first area can be defined as a combined surface area of the diffractive focusing features that are at least partially within the first portion, divided by a surface area of the first portion. A first quantity can be defined as a combined surface area of the diffractive focusing features that are at least partially within a second portion of the first area and the diffractive anti-reflection features that are at least partially within the second portion, divided by a surface area of the second portion. A second quantity can be defined as unity minus the first quantity. A third quantity can be defined as the second quantity multiplied by the refractive index of the at least one material at the wavelength. The effective refractive index for the second portion can be defined as a sum of the first quantity and the third quantity.

In other examples, the plurality of diffractive anti-reflection features can be etched to a second depth that is less than the wavelength. The plurality of diffractive anti-reflection features can be distributed in the first area to have a duty cycle that is constant over the first area.

In some examples, the first surface can be planar. In some examples, the first depth can be between about twice the wavelength and about five times the wavelength. In some examples, the second depth can be within 20% of a quantity defined as the wavelength, divided by four, divided by a square root of the refractive index of the at least one material at the wavelength.

Although the inventive concept has been described in detail for the purpose of illustration based on various examples, it is to be understood that such detail is solely for that purpose and that the inventive concept is not limited to the disclosed examples, but, on the contrary, is intended to cover modifications and equivalent arrangements that are within the spirit and scope of the appended claims. For example, it is to be understood that the present disclosure contemplates that, to the extent possible, one or more features of any example can be combined with one or more features of any other example.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

EXAMPLES

To further illustrate the device, related system, and/or and related method discussed herein, a non-limiting list of examples is provided below. Each of the following non-limiting examples can stand on its own, or can be combined in any permutation or combination with any one or more of the other examples.

In Example 1, an optical element can include: a body formed from at least one material that is transparent at a wavelength, the body including a first surface that extends laterally over a first area, the first surface including diffractive focusing features that extend into the body, the diffractive focusing features having a same first depth that is greater than the wavelength, the diffractive focusing features located in the first area to have a duty cycle that varies over the first area, the first surface further including diffractive anti-reflection features that extend into the body, the diffractive anti-reflection features having a same second depth that is less than the wavelength, the diffractive anti-reflection features located in the first area such that an effective refractive index of the diffractive focusing features and the diffractive anti-reflection features, together, is less than or equal to 120% of a square root of a refractive index of the at least one material at the wavelength.

In Example 2, the optical element of Example 1 can optionally be configured such that: the duty cycle of the diffractive focusing features within a first portion of the first area is defined as a combined surface area of the diffractive focusing features that are at least partially within the first portion, divided by a surface area of the first portion; a first quantity is defined as a combined surface area of the diffractive focusing features that are at least partially within a second portion of the first area and the diffractive anti-reflection features that are at least partially within the second portion, divided by a surface area of the second portion; a second quantity is defined as unity minus the first quantity; a third quantity is defined as the second quantity multiplied by the refractive index of the at least one material at the wavelength; and the effective refractive index for the second portion is defined as a sum of the first quantity and the third quantity.

In Example 3, the optical element of any one of Examples 1-2 can optionally be configured such that the surface area of the first portion is larger than a square of the wavelength.

In Example 4, the optical element of any one of Examples 1-3 can optionally be configured such that the effective refractive index within the first area is less than or equal to 110% of the square root of the refractive index of the at least one material at the wavelength.

In Example 5, the optical element of any one of Examples 1-4 can optionally be configured such that the effective refractive index within the first area is less than or equal to the square root of the refractive index of the at least one material at the wavelength.

In Example 6, the optical element of any one of Examples 1-5 can optionally be configured such that the first surface is planar.

In Example 7, the optical element of any one of Examples 1-6 can optionally be configured such that the diffractive focusing features have respective lateral sizes that vary over the first area and are smaller than the wavelength.

In Example 8, the optical element of any one of Examples 1-7 can optionally be configured such that: the diffractive focusing features have centers that are regularly spaced over the first area; and the spacing between adjacent centers is less than about one-third of the wavelength.

In Example 9, the optical element of any one of Examples 1-8 can optionally be configured such that the diffractive focusing features and the diffractive anti-reflection features are interleaved and are distributed uniformly over the first area.

In Example 10, the optical element of any one of Examples 1-9 can optionally be configured such that the first depth is between about twice the wavelength and about five times the wavelength.

In Example 11, the optical element of any one of Examples 1-10 can optionally be configured such that the second depth is within 20% of a quantity defined as the wavelength, divided by four, divided by a square root of the refractive index of the at least one material at the wavelength.

In Example 12, the optical element of any one of Examples 1-11 can optionally be configured such that the second depth is within 10% of a quantity defined as the wavelength, divided by four, divided by a square root of the refractive index of the at least one material at the wavelength.

In Example 13, the optical element of any one of Examples 1-12 can optionally be configured such that the second depth substantially equals a quantity defined as the wavelength, divided by four, divided by a square root of the refractive index of the at least one material at the wavelength.

In Example 14, the optical element of any one of Examples 1-13 can optionally be configured such that the diffractive focusing features and the diffractive anti-reflection features are etched into the first surface.

In Example 15, a method for forming an optical element can include: providing a body, the body being formed from at least one material that is transparent at a wavelength; etching a plurality of diffractive focusing features into a first area of a first surface of the body, the plurality of diffractive focusing features being etched to a first depth that is greater than the wavelength, the plurality of diffractive focusing features being distributed in the first area to have a duty cycle that varies over the first area: and etching a plurality of diffractive anti-reflection features into the first area of the first surface of the body, the plurality of diffractive anti-reflection features being etched to a second depth that is less than the wavelength, the plurality of diffractive anti-reflection features being distributed in the first area such that an effective refractive index of the diffractive focusing features and the diffractive anti-reflection features, together, is less than or equal to 120% of a square root of a refractive index of the at least one material at the wavelength.

In Example 16, the method of Example 15 can optionally be configured such that; the duty cycle of the diffractive focusing features within a first portion of the first area is defined as a combined surface area of the diffractive focusing features that are at least partially within the first portion, divided by a surface area of the first portion; a first quantity is defined as a combined surface area of the diffractive focusing features that are at least partially within a second portion of the first area and the diffractive anti-reflection features that are at least partially within the second portion, divided by a surface area of the second portion; a second quantity is defined as unity minus the first quantity; a third quantity is defined as the second quantity multiplied by the refractive index of the at least one material at the wavelength; and the effective refractive index for the second portion is defined as a sum of the first quantity and the third quantity.

In Example 17, the method of any one of Examples 15-16 can optionally be configured such that: the first surface is planar; the first depth is between about twice the wavelength and about five times the wavelength; and the second depth is within 20% of a quantity defined as the wavelength, divided by four, divided by a square root of the refractive index of the at least one material at the wavelength.

In Example 18, an optical element can include: a body formed from at least one of silicon or germanium, the body being transparent at a wavelength, the body including a first surface that extends laterally over a first area, the first surface including means for focusing light at the wavelength, the means for focusing light extending into the body to a same first depth that is greater than the wavelength, the means for focusing light located in the first area to have a duty cycle that varies over the first area, the first surface further including means for reducing reflection of light at the wavelength, the means for reducing reflection of light extending into the body to a same second depth that is less than the wavelength, the means for reducing reflection of light located in the first area such that an effective refractive index of the diffractive focusing features and the diffractive anti-reflection features, together, is less than or equal to 120% of a square root of a refractive index of the at least one material at the wavelength.

In Example 19, the optical element of Example 18 can optionally be configured such that; the duty cycle of the diffractive focusing features within a first portion of the first area is defined as a combined surface area of the diffractive focusing features that are at least partially within the first portion, divided by a surface area of the first portion; a first quantity is defined as a combined surface area of the diffractive focusing features that are at least partially within a second portion of the first area and the diffractive anti-reflection features that are at least partially within the second portion, divided by a surface area of the second portion; a second quantity is defined as unity minus the first quantity; a third quantity is defined as the second quantity multiplied by the refractive index of the at least one material at the wavelength; and the effective refractive index for the second portion is defined as a sum of the first quantity and the third quantity.

In Example 20, the optical element of any one of Examples 18-19 can optionally be configured such that: the first surface is planar; the first depth is between about twice the wavelength and about five times the wavelength; and the second depth is within 20% of a quantity defined as the wavelength, divided by four, divided by a square root of the refractive index of the at least one material at the wavelength.

In Example 21, an optical element can include: a body formed from at least one material that is transparent at a wavelength, the body including a first surface that extends laterally over a first area, the first surface including diffractive focusing features that extend into the body, the diffractive focusing features having a same first depth that is greater than the wavelength, the diffractive focusing features located in the first area to have a duty cycle that varies over the first area, the first surface further including diffractive anti-reflection features that extend into the body, the diffractive anti-reflection features having a same second depth that is less than the wavelength, the diffractive anti-reflection features located in the first area to have a duty cycle that is constant over the first area.

In Example 22, the optical element of Example 21 can optionally be configured such that: the duty cycle of the diffractive focusing features within a first portion of the first area is defined as a combined surface area of the diffractive focusing features that are at least partially within the first portion, divided by a surface area of the first portion; and the duty cycle of the diffractive anti-reflection features within a second portion of the first area is defined as a combined surface area of the diffractive anti-reflection features that are at least partially within the second portion, divided by a surface area of the second portion.

In Example 23, the optical element of any one of Examples 21-22 can optionally be configured such that the surface area of the first portion and the surface area of the second portion are each larger than a square of the wavelength.

In Example 24, the optical element of any one of Examples 21-23 can optionally be configured such that the first surface is planar.

In Example 25, the optical element of any one of Examples 21-24 can optionally be configured such that the diffractive focusing features have respective lateral sizes that vary over the first area and are smaller than the wavelength.

In Example 26, the optical element of any one of Examples 21-25 can optionally be configured such that: the diffractive focusing features have centers that are regularly spaced over the first area; and the spacing between adjacent centers is less than about one-third of the wavelength.

In Example 27, the optical element of any one of Examples 21-26 can optionally be configured such that the diffractive focusing features and the diffractive anti-reflection features are interleaved over the first area.

In Example 28, the optical element of any one of Examples 21-27 can optionally be configured such that the diffractive focusing features and the diffractive anti-reflection features are distributed uniformly over the first area.

In Example 29, the optical element of any one of Examples 21-28 can optionally be configured such that the first depth is between about twice the wavelength and about five times the wavelength.

In Example 30, the optical element of any one of Examples 21-29 can optionally be configured such that the second depth is within 20% of a quantity defined as the wavelength, divided by four, divided by a square root of a refractive index of the at least one material at the wavelength.

In Example 31, the optical element of any one of Examples 21-30 can optionally be configured such that the second depth is within 10% of a quantity defined as the wavelength, divided by four, divided by a square root of a refractive index of the at least one material at the wavelength.

In Example 32, the optical element of any one of Examples 21-31 can optionally be configured such that the second depth substantially equals a quantity defined as the wavelength, divided by four, divided by a square root of a refractive index of the at least one material at the wavelength.

In Example 33, the optical element of any one of Examples 21-32 can optionally be configured such that the wavelength is between about 7 microns and about 14 microns.

In Example 34, the optical element of any one of Examples 21-33 can optionally be configured such that the diffractive focusing features and the diffractive anti-reflection features are etched into the first surface.

In Example 35, a method for forming an optical element can include: providing a body, the body being formed from at least one material that is transparent at a wavelength; etching a plurality of diffractive focusing features into a first area of a first surface of the body, the plurality of diffractive focusing features being etched to a first depth that is greater than the wavelength, the plurality of diffractive focusing features being distributed in the first area to have a duty cycle that varies over the first area; and etching a plurality of diffractive anti-reflection features into the first area of the first surface of the body, the plurality of diffractive anti-reflection features being etched to a second depth that is less than the wavelength, the plurality of diffractive anti-reflection features being distributed in the first area to have a duty cycle that is constant over the first area.

In Example 36, the method of Example 35 can optionally be configured such that: the duty cycle of the diffractive focusing features within a first portion of the first area is defined as a combined surface area of the diffractive focusing features that are at least partially within the first portion, divided by a surface area of the first portion; the duty cycle of the diffractive anti-reflection features within a second portion of the first area is defined as a combined surface area of the diffractive anti-reflection features that are at least partially within the second portion, divided by a surface area of the second portion; and the surface area of the first portion and the surface area of the second portion are each larger than a square of the wavelength.

In Example 37, the method of any one of Examples 35-36 can optionally be configured such that: the first surface is planar; the first depth is between about twice the wavelength and about five times the wavelength; and the second depth is within 20% of a quantity defined as the wavelength, divided by four, divided by a square root of the refractive index of the at least one material at the wavelength.

In Example 38, an optical element can include: a body formed from at least one of silicon or germanium, the body being transparent at a wavelength, the body including a first surface that extends laterally over a first area, the first surface including means for focusing light at the wavelength, the means for focusing light extending into the body to a same first depth that is greater than the wavelength, the means for focusing light located in the first area to have a duty cycle that varies over the first area, the first surface further including means for reducing reflection of light at the wavelength, the means for reducing reflection of light extending into the body to a same second depth that is less than the wavelength, the means for reducing reflection of light located in the first area to have a duty cycle that is constant over the first area.

In Example 39, the optical element of Example 38 can optionally be configured such that: the duty cycle of the diffractive focusing features within a first portion of the first area is defined as a combined surface area of the diffractive focusing features that are at least partially within the first portion, divided by a surface area of the first portion; the duty cycle of the diffractive anti-reflection features within a second portion of the first area is defined as a combined surface area of the diffractive anti-reflection features that are at least partially within the second portion, divided by a surface area of the second portion; and the surface area of the first portion and the surface area of the second portion are each larger than a square of the wavelength.

In Example 40, the optical element of any one of Examples 38-39 can optionally be configured such that: the first surface is planar; the first depth is between about twice the wavelength and about five times the wavelength; and the second depth is within 20% of a quantity defined as the wavelength, divided by four, divided by a square root of the refractive index of the at least one material at the wavelength.

What is claimed is:
1. An optical element, comprising:
a body formed from at least one material that is transparent at a wavelength, the body including a first surface that extends laterally over a first area, the first surface including diffractive focusing features that extend into the body, the diffractive focusing features having a same first depth that is greater than the wavelength, the diffractive focusing features located in the first area to have a duty cycle that varies over the first area, the first surface further including diffractive anti-reflection features that extend into the body, the diffractive anti-reflection features having a same second depth that is less than the wavelength, the diffractive focusing features and the diffractive anti-reflection features being interleaved, the diffractive anti-reflection features located in the first area such that an effective refractive index of the diffractive focusing features and the diffractive anti-reflection features, together, is less than or equal to a specified value.

2. The optical element of claim 1, wherein the specified value equals 120% of a square root of a refractive index of the at least one material at the wavelength.

3. The optical element of claim 1, wherein:

the duty cycle of the diffractive focusing features within a first portion of the first area is defined as a combined surface area of the diffractive focusing features that are at least partially within the first portion, divided by a surface area of the first portion;

a first quantity is defined as a combined surface area of the diffractive focusing features that are at least partially within a second portion of the first area and the diffractive anti-reflection features that are at least partially within the second portion, divided by a surface area of the second portion;

a second quantity is defined as unity minus the first quantity;

a third quantity is defined as the second quantity multiplied by a refractive index of the at least one material at the wavelength; and the effective refractive index for the second portion is defined as a sum of the first quantity and the third quantity.

4. The optical element of claim 3, wherein the surface area of the first portion is larger than a square of the wavelength.

5. The optical element of claim 1, wherein the effective refractive index within the first area is less than or equal to 110% of a square root of a refractive index of the at least one material at the wavelength.

6. The optical element of claim 1, wherein the effective refractive index within the first area is less than or equal to a square root of a refractive index of the at least one material at the wavelength.

7. The optical element of claim 1, wherein the first surface is planar.

8. The optical element of claim 1, wherein the diffractive focusing features have respective lateral sizes that vary over the first area and are smaller than the wavelength.

9. The optical element of claim 1, wherein:

the diffractive focusing features have centers that are regularly spaced over the first area; and the spacing between adjacent centers is less than about one-third of the wavelength.

10. The optical element of claim 1, wherein the diffractive focusing features and the diffractive anti-reflection features are distributed uniformly over the first area.

11. The optical element of claim 1, wherein the first depth is between about twice the wavelength and about five times the wavelength.

12. The optical element of claim 1, wherein the second depth is within 20% of a quantity defined as the wavelength, divided by four, divided by a square root of a refractive index of the at least one material at the wavelength.

13. The optical element of claim 1, wherein the second depth substantially equals a quantity defined as the wavelength, divided by four, divided by a square root of a refractive index of the at least one material at the wavelength.

14. The optical element of claim 1, wherein the diffractive focusing features and the diffractive anti-reflection features are etched into the first surface.

15. A method for forming an optical element, the method comprising:

providing a body, the body being formed from at least one material that is transparent at a wavelength;

etching a plurality of diffractive focusing features into a first area of a first surface of the body, the plurality of diffractive focusing features being etched to a first depth that is greater than the wavelength, the plurality of diffractive focusing features being distributed in the first area to have a duty cycle that varies over the first area; and etching a plurality of diffractive anti-reflection features into the first area of the first surface of the body, the plurality of diffractive anti-reflection features being etched to a second depth that is less than the wavelength, the diffractive focusing features and the diffractive anti-reflection features being interleaved, the plurality of diffractive anti-reflection features being distributed in the first area such that an effective refractive index of the diffractive focusing features and the diffractive anti-reflection features, together, is less than or equal to a specified value.

16. The method of claim 15, wherein:

the duty cycle of the diffractive focusing features within a first portion of the first area is defined as a combined surface area of the diffractive focusing features that are at least partially within the first portion, divided by a surface area of the first portion;

a first quantity is defined as a combined surface area of the diffractive focusing features that are at least partially within a second portion of the first area and the diffractive anti-reflection features that are at least partially within the second portion, divided by a surface area of the second portion;

a second quantity is defined as unity minus the first quantity;

a third quantity is defined as the second quantity multiplied by a refractive index of the at least one material at the wavelength; and the effective refractive index for the second portion is defined as a sum of the first quantity and the third quantity.

17. The method of claim 15, wherein:

the specified value equals 120% of a square root of a refractive index of the at least one material at the wavelength;

the first surface is planar;

the first depth is between about twice the wavelength and about five times the wavelength; and the second depth is within 20% of a quantity defined as the wavelength, divided by four, divided by the square root of the refractive index of the at least one material at the wavelength.

18. An optical element, comprising:
a body formed from at least one of silicon or germanium, the body being transparent at a wavelength,
the body including a first surface that extends laterally over a first area,
the first surface including diffractive focusing features at the wavelength,
the diffractive focusing features extending into the body to a same first depth that is greater than the wavelength,
the diffractive focusing features located in the first area to have a duty cycle that varies over the first area,
the first surface further including diffractive anti-reflection features configured to reduce reflection of light at the wavelength,
the diffractive anti-reflection features extending into the body to a same second depth that is less than the wavelength,
the diffractive focusing features and the diffractive anti-reflection features being interleaved.

19. The optical element of claim 18, wherein the diffractive anti-reflection features are located in the first area such that an effective refractive index of the diffractive focusing features and the diffractive anti-reflection features, together, is less than or equal to a specified value.

20. The optical element of claim 19, wherein:
the duty cycle of the diffractive focusing features within a first portion of the first area is defined as a combined surface area of the diffractive focusing features that are at least partially within the first portion, divided by a surface area of the first portion;
a first quantity is defined as a combined surface area of the diffractive focusing features that are at least partially within a second portion of the first area and the diffractive anti-reflection features that are at least partially within the second portion, divided by a surface area of the second portion;
a second quantity is defined as unity minus the first quantity;
a third quantity is defined as the second quantity multiplied by a refractive index of the body at the wavelength;
the effective refractive index for the second portion is defined as a sum of the first quantity and the third quantity;
the specified value equals 120% of a square root of a refractive index of the body at the wavelength;
the first surface is planar;
the first depth is between about twice the wavelength and about five times the wavelength; and
the second depth is within 20% of a quantity defined as the wavelength, divided by four, divided by the square root of the refractive index of the body at the wavelength.

* * * * *